Sept. 20, 1966 P. E. BECKING 3,273,687

TAPE HANDLING DEVICE

Filed July 9, 1963

INVENTOR.

PAUL E. BECKING.

BY Harness, Dickey & Pierce

ATTORNEYS

United States Patent Office 3,273,687 Patented Sept. 20, 1966

3,273,687

TAPE HANDLING DEVICE

Paul E. Becking, Lake Orion, Mich., assignor to Dura Corporation, Oak Park, Mich., a corporation of Michigan Filed July 9, 1963, Ser. No. 293,822
5 Claims. (Cl. 197—180)

This invention relates to automatic writing systems and more particularly to an attachement for supporting control tapes utilized with punch and/or reader apparatus of such systems.

It is a principal object of the present invention to provide an attachment for writing systems for supporting control tapes in out-of-the-way positions greatly facilitating movement of the control tapes and resulting in longer wear and useful life of the tapes.

Another object of the present invention is to provide an attachment for a writing system which will enable long lengths of a control tape to be arranged in a plurality of non-intersecting loops preventing engagement and entanglement of adjacent portions of the tape.

A further object of the present invention is to provide an attachment for handling tape in a writing system or the like, which supports the tape in a manner facilitating smooth and easy non-binding travel of the tape through the associated writing system apparatus.

Still another object of the present invention is to provide a tape handling device which is readily adjustable to handle varying lengths of tape from time to time.

Still another object of the present invention is to provide a tape handling device in which the lengths of tape handled can be varied greatly without the provision of additional equipment, or changes in the number of parts of the device, and by simple adjustments which may be formed manually without the requirement of any adjustment tools.

The aforementioned objects, and others, are fulfilled by the application of the inventive principles hereinafter disclosed in detail by reference to the accompanying drawings wherein.

Figures 1, 2, 3, 4:
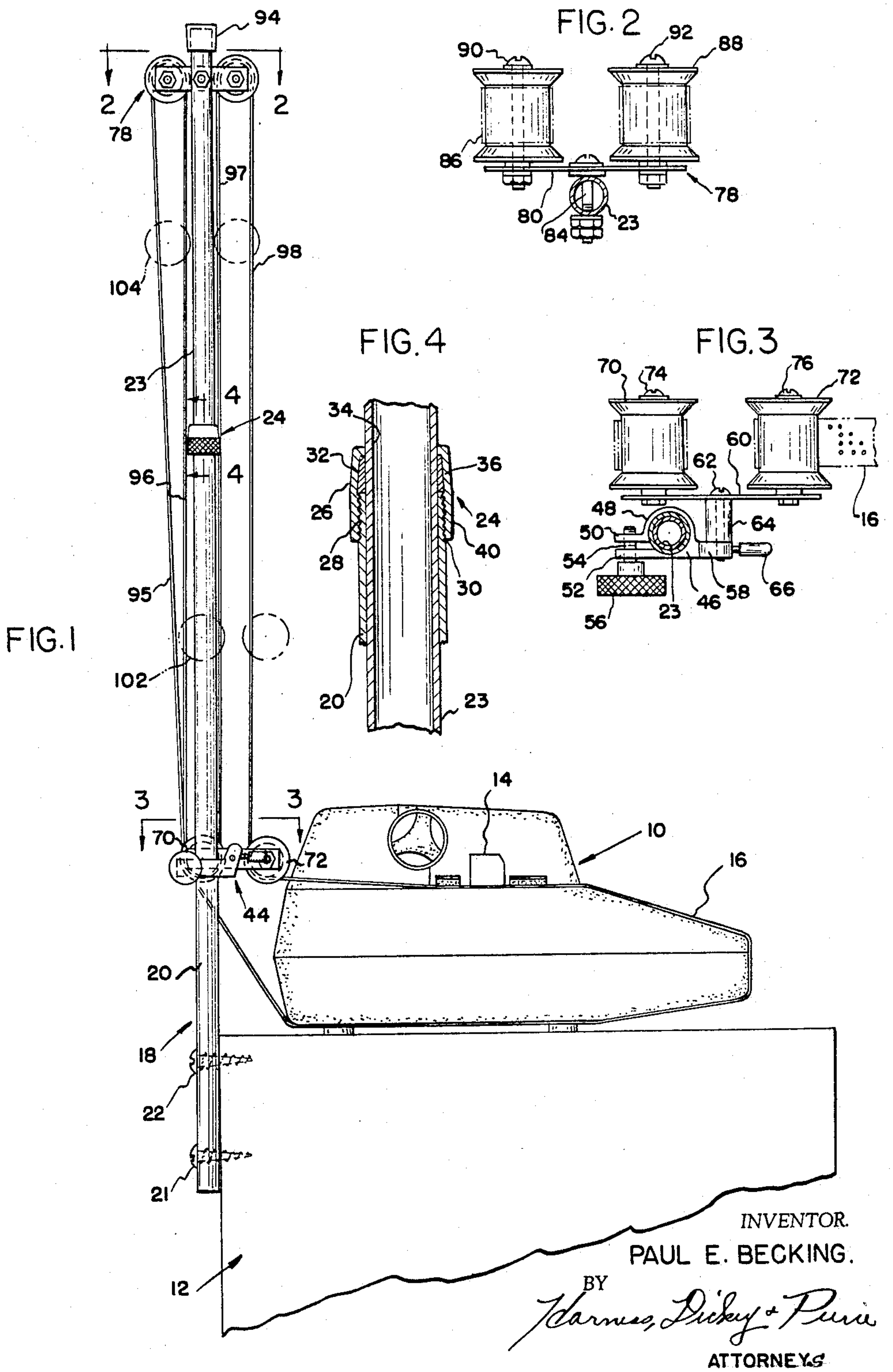
FIGURE 1 shows a side elevational view of an illustrative embodiment of the invention.
FIGURE 2 is a sectional view taken along the line 2—2 in FIGURE 1.
FIGURE 3 is a sectional view taken along the line 3—3 in FIGURE 1.
FIGURE 4 is a sectional view taken along the line 4—4 in FIGURE 1.

Referring now to FIGURE 1, automatic writing system apparatus 10 with which the subject attachment may be used is shown mounted on an associated stand or support 12. In the illustrative embodiment the automatic writing system apparatus 10 comprises, for example, an electric typewriter having a reader device, including tape drive mechanism part of which is shown at 14, incorporated therewith and adapted to actuate the typewriter in accordance with coded signals stored on a continuous endless band of tape 16 by perforations, or the like, formed therein. The tape drive mechanism is of conventional design and comprises a rotatable pin wheel means such as shown in copending application Serial No. 227,767, filed October 2, 1962. The tape 16 is conventionally made of relatively thin paper material and has 4, 6 or 8 code channels of spaced perforations.

In prior practice, the tapes have been supported solely by the reader device 14 on the casing of the typewriter. The unsupported portions of the tape hung down the sides of the apparatus and were piled on the support stand 12 or even sometimes on the floor around the apparatus. The tape moves through the reader at a relatively rapid rate and is subject to continual twisting and pulling resulting in wear and tear. Personnel operating the apparatus were likely to become entangled in the tape causing the tape to be broken or creased.

To obviate these problems, a tape support 18 is mounted adjacent the writing system apparatus and comprises, in the preferred embodiment, a tubular base 20 of aluminum or the like, which is fastened to the rear of the support 12 by suitable fastening means 21, 22. The support tube 20 extends vertically upwardly and telescopically supports a mast portion 23 which may be formed from a piece of tubular material having an outside diameter approximately equal to or slightly smaller than the inside diameter of the support tube 20. The mast is therefore freely slidable upwardly and downwardly within the support tube 20 and may be held in any of a plurality of adjusted positions. Locking mechanism 24 is provided to fixedly secure the mast in any of a plurality of adjusted positions and comprises a cap 26 having a threaded interior portion 28 which is adapted to be threadably associated with a correspondingly threaded portion 30 at the upper end of the support 20. A tapered seat 32 is provided in the upper end of the cap and terminates adjacent an upper opening 34 through which the mast 23 is slidably received. A split clamping or locking ring 36 having a tapered surface corresponding to the seat 32 is mounted about the mast 23 and is adapted to be seated against the top of the support tube 20. The outer surface of the cap may be knurled as indicated at 40 to facilitate manual rotation of the cap to loosen and tighten the split locking ring on the mast 23.

Tape guide and support means are mounted on the mast and tubular support and comprise a lower pulley assembly 44 operatively oriented relative to the reader device 14 and adjustably mounted on the support tube 20 by a slidable support bracket 46 having an annular hub portion 48 with a central bore of a diameter approximately equal to or slightly larger than the outside diameter of the support tube 20. Clamping means are provided by bifurcated leg portions 50, 52, and a threaded member 54 which extends through the legs and is adapted upon rotation in one direction to cause separation of the legs to loosen the slide bracket on the support tube and is adapted upon rotation in the opposite direction to cause movement of the legs toward one another to tighten the slide bracket on the support tube. A manually operable control knob 56 having a knurled outer surface is mounted on the outer end of the threaded fastener 54. The other end of the slide bracket is provided with an upwardly extending flange 58 to which a pulley support plate 60 is fixedly secured by a fastener 62 and a spacer 64. In addition, a slide handle 66 may be provided to facilitate sliding adjustment of the bracket on the support tube. A plurality of pulley means in the form of spools 70, 72 are rotatably mounted on the support plate 60 by suitable shaft elements 74, 76 which, in the preferred embodiment, take the form of conventional bolt-type fasteners. The number of spools or pulleys provided may be varied as desired by merely extending the plate 60 and providing additional fastening space.

A similar tape guide and support means comprising an upper pulley assembly 78 is provided at the top of the mast 23. A support plate 80 is fixedly secured to the mast by a bolt 84. Spaced pulley means are provided by spools 86, 88 and are rotatably secured to the support plate by shaft means 90, 92 in the form of conventional bolt-type fasteners. A protective cap 94 may be provided on the end of the mast 23 if desired.

In operation, a portion of the band of coded tape 16 is theaded through guide means associated with the reader mechanism 14 and engaged with a drive sprocket in a conventional manner. The rest of the tape is wound around the pulley means to form a plurality of tape loops 95, 96, 97, 98. The relative positions of the lower pulley assembly 44 and the upper pulley assembly 78 are adjusted to obtain the proper tension on the tape. In this manner the tape is moved continuously through the reader mechanism 14 by the drive sprocket associated therewith and around and through an identical path defined by the loop portion around the writing unit 10 and the loop portions around the spools. The length of the loop portions 95, 96, 97, 98 may be varied throughout a wide range of adjustment by, for example, moving the pulley assembly 44 to a position such as indicated in phantom at 102 and/or by moving the pulley assembly 78 to a position such as indicated in phantom at 104, or any position upwardly or downwardly spaced therefrom as desired. The adjustments are made by simple manual manipulations including loosening the cap 28 and sliding the mast 23 upwardly and downwardly within the support tube 20, and/or loosening the clamps 54 and sliding the pulley assembly along the support tube 20.

It is contemplated that those skilled in the art to which this invention relates will readily appreciate the many advantages of an attachment as hereinbefore described and that the inventive principles can be variously incorporated in alternative arrangements to meet the exigencies of particular situations. Therefore, it is intended that the scope of the appended claims be construed to include various alternative embodiments of the invention except insofar as limited by the prior art.

What is claimed is:

1. In combination with an automatic writing system including, in a common casing, a writing unit and coded tape feed mechanism for imparting movement to an endless band of coded tape; an endless band of coded tape drivably associated with said coded tape feed mechanism and adapted to be driven substantially horizontally through the coded tape feed mechanism; and a separate vertically extending coded tape supporting device associated with said automatic writing system for supporting said endless band of coded tape, said tape supporting device being completely separate from and extending upwardly above the components of said automatic writing system within the common casing, a support for said automatic writing system, mounting means for said tape supporting device mounting said tape supporting device in spaced relationship to said automatic writing system said mounting means connecting said tape supporting device to said support for said automatic writing system in spaced and operatively oriented relationship to said common casing, a first pulley means on said tape supporting device located in general vertical alignment with said automatic writing system opposite said coded tape feed mechanism, a second pulley means on said tape supporting device located vertically above said first pulley means and said automatic writing system, and said endless band of coded tape extending through said coded tape feed mechanism and around said first pulley means in a first elongated loop elongated in a generally horizontal direction and extending around said first pulley means and said second pulley means in at least one other elongated loop elongated in a generally vertical direction.

2. The invention as defined in claim 1 and wherein said tape supporting device is adjustable vertically to vary the length of said other loop.

3. The invention as defined in claim 1 and wherein said first pulley means and said second pulley means includes a plurality of pulley elements, and said endless band of coded tape extends around said first pulley means and said second pulley means in a plurality of loops elongated in a generally vertical direction.

4. The invention as defined in claim 1 and wherein said tape supporting device comprises a vertically extending mast, said mast being formed by telescopically mounted tubular elements and locking means to variously secure said tubular elements in a plurality of vertically spaced positions.

5. A tape supporting device adapted to support an endless band of coded tape for use in operation of an automatic writing system by association of the endless band of coded tape with tape drive mechanism by which the endless band of tape is adapted to be driven in a generally horizontal path comprising: a first vertically extending tubular member, mounting means for mounting said first vertically extending tubular member in spaced relationship to said automatic writing system adjacent to said tape drive mechanism, a first pulley means mounted on said first vertically extending tubular member and adapted to guidably receive said endless band of tape and hold a horizontally extending loop of said endless band of coded tape, an adjustable bracket means supported by said first vertically extending tubular member to variably position said first pulley means in general vertical alignment with said tape drive mechanism, a second vertically extending tubular member telescopically mounted on said first vertically extending tubular member, locking means for variably fixedly positioning said second vertically extending tubular member on said first vertically extending tubular member, and a second pulley means mounted on said second vertically extending tubular member in vertically spaced relationship to said first pulley means and adapted to guidably receive said endless band of coded tape and hold at least one vertically extending loop of said endless band of coded tape.

References Cited by the Examiner

UNITED STATES PATENTS

| | | | |
|---|---|---|---|
| 1,171,354 | 2/1916 | Roberts | 197—20 |
| 2,552,205 | 5/1951 | Moss | 95—86 |
| 2,599,269 | 6/1952 | Markle | 95—86 |
| 2,747,717 | 5/1956 | Cunningham et al. | 197—133 |
| 2,800,539 | 7/1957 | Edminster et al. | 234—20 |
| 2,804,278 | 8/1957 | Jewett | 95—86 X |
| 2,806,416 | 9/1957 | Jones | 95—86 |
| 2,842,249 | 7/1958 | Morgan et al. | 197—133 |
| 2,983,355 | 5/1961 | Taperell | 197—133 |
| 3,028,944 | 4/1962 | Taperell | 197—133 |

FOREIGN PATENTS

| | | |
|---|---|---|
| 716,417 | 10/1931 | France. |

ROBERT E. PULFREY, *Primary Examiner.*

ERNEST T. WRIGHT, *Assistant Examiner.*